United States Patent
Maziarz

(10) Patent No.: US 7,717,314 B2
(45) Date of Patent: May 18, 2010

(54) FRICTION STIR WELDING TOOL

(75) Inventor: Robert Jan Maziarz, Bristol (GB)

(73) Assignee: Airbus UK Limited, Bristol (GB)

( * ) Notice: Subject to any disclaimer, the term of this patent is extended or adjusted under 35 U.S.C. 154(b) by 63 days.

(21) Appl. No.: 11/883,120

(22) PCT Filed: Jan. 26, 2006

(86) PCT No.: PCT/GB2006/000263
§ 371 (c)(1),
(2), (4) Date: Jul. 26, 2007

(87) PCT Pub. No.: WO2006/082370
PCT Pub. Date: Aug. 10, 2006

(65) Prior Publication Data
US 2008/0149689 A1 Jun. 26, 2008

(30) Foreign Application Priority Data
Feb. 1, 2005 (GB) ................................. 0502067.2

(51) Int. Cl.
*B23K 20/12* (2006.01)
*B23K 37/00* (2006.01)
*B23K 31/02* (2006.01)
(52) U.S. Cl. ..................... 228/2.1; 228/112.1
(58) Field of Classification Search .............. 228/2.1, 228/112.1, 114.5, 2.3
See application file for complete search history.

(56) References Cited
U.S. PATENT DOCUMENTS

| 5,460,317 A | 10/1995 | Thomas et al. |
| 5,813,592 A | 9/1998 | Midling et al. |
| 7,275,675 B1 * | 10/2007 | Carter et al. ................ 228/2.1 |
| 2004/0195291 A1 * | 10/2004 | Andersson et al. .......... 228/2.1 |
| 2006/0043151 A1 * | 3/2006 | Stol et al. .................... 228/2.1 |
| 2006/0157531 A1 * | 7/2006 | Packer et al. ................ 228/2.1 |

FOREIGN PATENT DOCUMENTS

| EP | 1 160 044 A3 | 12/2001 |
| EP | 1 510 280 A1 | 3/2005 |
| GB | 2306366 A * | 5/1997 |
| WO | WO 93/10935 | 6/1993 |
| WO | WO 95/26254 | 10/1995 |
| WO | WO 99/52669 | 10/1999 |

OTHER PUBLICATIONS

"circumferential." Dictionary.com Unabridged (v 1.1). Random House, Inc. Jun. 25, 2009. <Dictionary.com http://dictionary.reference.com/browse/circumferential>.*

(Continued)

*Primary Examiner*—Kevin P Kerns
*Assistant Examiner*—Jacky Yuen
(74) *Attorney, Agent, or Firm*—Patterson, Thuente, Skaar & Christensen, P.A.

(57) ABSTRACT

A friction stir welding tool is used in welding structures. The tool comprises a shoulder and a probe extending from the shoulder. The probe has at least three sections equiangularly arranged around the longitudinal axis of the probe, each section comprising at least three contiguously arranged flats arranged about the axis of the probe. The flats are so arranged that the normal axes of the flats converge in a direction towards the axis of the probe thereby resulting in the sections each having a generally convex shape. The probe also includes a threaded portion disposed between each pair of adjacent generally convexly shaped unthreaded sections.

10 Claims, 2 Drawing Sheets

OTHER PUBLICATIONS

"contiguous." Dictionary.com Unabridged (v 1.1). Random House, Inc. Jun. 25, 2009. <Dictionary.com http://dictionary.reference.com/browse/contiguous>.*

P.A. Colegrove, et al., "Development of Trivex friction stir welding tool Parts 1 and 2," *Science and Technology of Welding and Joining*, vol. 9, No. 4, pp. 345-361 (2004).

* cited by examiner

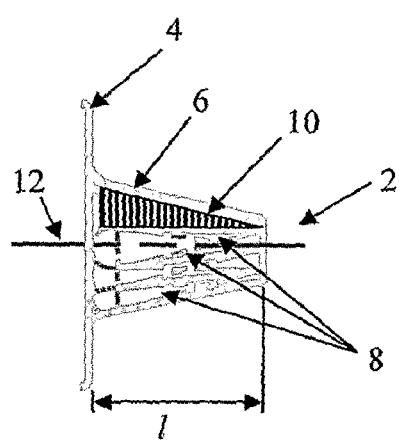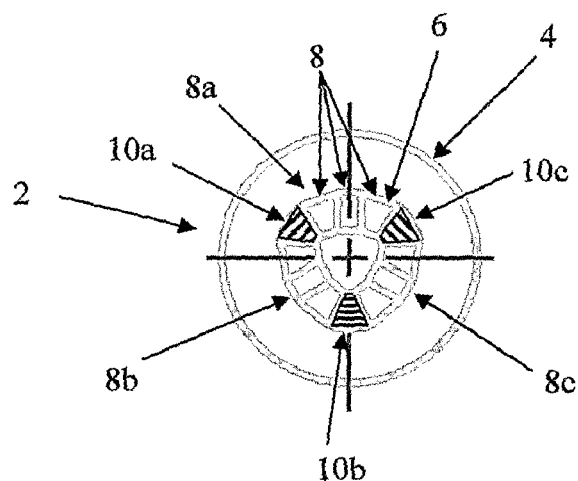
Fig. 2a    Fig. 2b
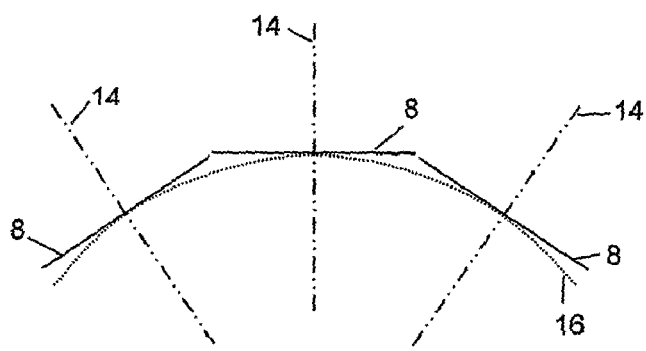
Fig. 2c
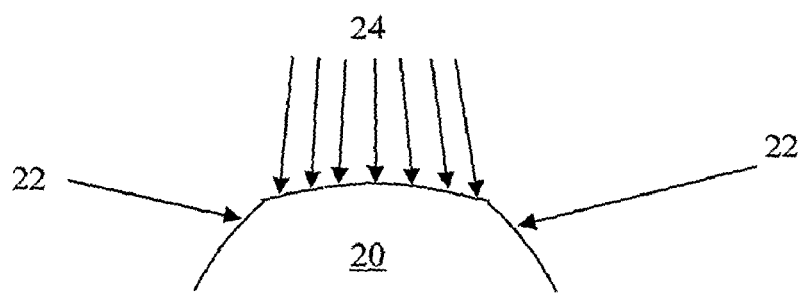
Fig. 3

FRICTION STIR WELDING TOOL

RELATED APPLICATIONS

The present application is a National Phase entry of PCT Application No. PCT/GB2006/000263, filed Jan. 26, 2006, which claims priority from United Kingdom Application Number 0502067.2, filed Feb. 1, 2005, the disclosures of which are hereby incorporated by reference herein in their entirety.

TECHNICAL FIELD

The present invention relates to a friction stir welding (FSW) tool, to a method of manufacture thereof and to a method of welding two metal work-pieces together. The invention relates in particular, but not exclusively, to FSW tools for welding together two relatively thick work-pieces made from metal alloys, for example aluminium alloys, that have been prepared for use in the manufacture of aircraft components.

BACKGROUND OF THE INVENTION

Friction stir welding is a relatively new welding process, a summary of the background to which may be found in U.S. Pat. No. 5,460,317 (Thomas et al), U.S. Pat. No. 5,813,592 (Midling et al), WO 93/10935 (The Welding Institute), and WO 95/26254 (Norsk Hydro A.S.), the specifications of which are hereby fully incorporated herein by reference thereto. Generally, the term "friction stir welding" is understood to encompass any method of welding in which a probe of material harder than the work-piece material is caused to move relative to the work-piece to generate frictional heat causing the work-piece in the region of the probe to become plasticised, the probe effectively entering the work-piece. The probe is conventionally caused to rotate about the probe axis and to move along the work-piece along the length of the weld to be formed.

Studies have been made into how the shape of the FSW tool affects the welding process. One such study is described in the papers entitled "Development of Tri-vex friction stir weld tool" by P. A. Colegrove and H. R. Shercliff and published in two parts (Parts 1 & 2) in "Science and Technology of Welding and Joining 2004" (at pages 345-361 of Vol. 9, No. 4). The report describes various tool shapes including a "Tri-flat" tool, a "Tri-flute" tool and a "Tri-vex" tool. The Tri-flat tool is characterised by a cross-section having three flat regions equiangularly arranged about the axis of the tool, the Tri-flute tool has a cross-section that comprises three concavely shaped regions equiangular arranged about the axis of the tool and the Tri-vex tool has a cross-section that comprises three convexly shaped regions equiangular arranged about the axis of the tool. The report compares the loads on the tool necessary to effect FSW welding and concludes that the loads are lower in relation to the Tri-vex tool than the Tri-flute tool. The report describes the use of a Tri-vex tool to weld thin plate (having a thickness of 6.35 mm) using a pin/probe length of 6.2 mm. Experiments subsequently conducted using such a FSW tool having a Tri-vex tool shape and a pin length of 20 mm to weld together workpieces of a thickness of the order of 20 mm have produced weld joints suffering from defects. It has been found that the defect size produced by the Tri-vex tool can be improved by increasing the spindle speed but this results in the joint being subjected to excessive heat, which in turn gives reduced mechanical properties and a large heat affected zone.

It appears therefore that the use of a Tri-vex FSW tool to join thick work-pieces would not be suitable for joining aluminium alloy materials for use in aircraft manufacture as a result of the difficulties in producing joints of sufficiently high quality. Furthermore, the Tri-vex FSW tool is costly and complicated to manufacture as a result of the need to accurately machine three convexly shaped surfaces at three respective positions around the periphery of the tool and then machine threads onto said convexly-shaped surfaces.

It is an aim of the present invention to provide an improved FSW tool. Additionally or alternatively it is an aim of the present invention to provide a FSW tool that is able to produce in thick workpieces welds of a quality suitable for use in the manufacture of aircraft. Additionally or alternatively it is an aim of the present invention to provide a FSW tool that is able to produce welds of a quality equivalent or better than one or more of the FSW tools of the prior art mentioned above, but with reduced loads on the FSW tool during welding and/or without increasing joint heat input when compared to the use of the corresponding prior art FSW tool.

SUMMARY OF THE INVENTION

According to the present invention there is provided a friction stir welding tool comprising
 a shoulder,
 and a probe extending from the shoulder, wherein
 the probe has at least three sections equiangularly arranged around the longitudinal axis of the probe, each section comprising at least three contiguously arranged substantially flat portions arranged about the axis of the probe, the flat portions being so arranged that the normal axes of the flat portions converge in a direction towards the axis of the probe, and
 the probe includes a threaded portion disposed between each pair of adjacent sections.

During experimentation, it has been found that a FSW tool according to an embodiment of the present invention is able to produce sound welds (suitable for aircraft primary structure use) in 20 mm thick plate with reduced loads placed both on the FSW tool and on the FSW machine used to operate the tool when compared to the Tri-flat and Tri-flute shaped tools of the prior art described above.

The FSW tool according to the present invention may have a shape that is generally similar in shape to the Tri-vex FSW tool of the prior art, with the flat portions of each section of the tool of the present invention defining a generally convex profile. Not only is the present invention able to provide a FSW tool that sustains lower loads than prior art tools it is also able to be manufactured more easily than the Tri-vex FSW tool of the prior art as a result of the tool not needing to have convex sections machined away during manufacture. It will be appreciated that, in order for the flat portions of each section to define a generally convex profile, it is not necessary for the normal axes of the flat portions in each section to converge at a point; rather, the normal axes need only converge in the sense that the separation between every pair of axes reduces as one travels along the axes from the surfaces of the flat portions towards the axis of the probe.

The FSW tool of the present invention may be arranged to be able to weld together work-pieces having a thickness of greater than 10 mm. The probe may be longer than 10 mm. The probe may be about 20 mm or longer.

There may be only three sections, equiangularly arranged around the longitudinal axis of the probe, the sections being centred at 0 degrees, 120 degrees and 240 degrees, respectively. Alternatively, there may be four sections, equiangularly arranged around the longitudinal axis of the probe at 0 degrees, 90 degrees, 180 degrees and 270 degrees, respectively.

Each threaded portion is preferably contiguous with the sections between which it is disposed. Preferably, none of the sections are threaded. Thus, the tool may have alternating threaded and non-threaded regions about its axis.

The probe may be so shaped that it tapers along its length. Alternatively, the probe may be so shaped that it has a substantially constant diameter along at least the majority of its length. The probe may for example be generally cylindrical in shape.

The gradient of a flat portion along the length of the probe may be different from the gradient of the threaded portion. A flat portion may for example have a steeper gradient along the length of the probe than one of the threaded portions. Alternatively or additionally, a flat portion may have a gradient lower than one of the threaded portions. The gradient along the length of the probe may be different in respect of adjacent flat portions. (The gradient of a flat portion may be measured as the angle between the axis of the probe and the line of intersection between the flat portion and a notional plane that is perpendicular to the flat portion and that contains the axis of the probe.)

There may be more than three flat portions per section. For example, each section may comprise at least four substantially flat portions arranged about the axis of the probe. The number of flat portions per section may be less than 10. The flat portions are preferably contiguously arranged in each section. The present invention may have application where the number of flats per section is just two. Thus, the present invention further provides a friction stir welding tool comprising a shoulder, and a probe extending from the shoulder, wherein the probe has at least three sections arranged, preferably equiangularly, around the longitudinal axis of the probe, each section comprising a plurality of contiguously arranged substantially flat portions arranged about the axis of the probe, the flat portions being so arranged that the normal axes of the flat portions converge in a direction towards the axis of the probe. The probe may include a threaded portion disposed between each pair of adjacent sections. It will be appreciated of course that other features of the invention described herein may be incorporated into this broadened aspect of the invention.

There is also provided a method of manufacturing a friction stir welding tool according to any aspect of the invention defined herein. The method of manufacture preferably includes the steps of providing a tool having a shoulder and a threaded probe extending from the shoulder, and machining away material from the threaded probe to form at least three sections equiangularly arranged around the longitudinal axis of the probe, each section comprising at least three contiguously arranged substantially flat portions arranged about the axis of the probe, the flat portions being so arranged that the normal axes of the flat portions converge in a direction towards the axis of the probe. Conveniently, during manufacture of the tool, the tool may be mounted for rotation about its central axis, the machining away of different flat portions being achieved by rotating the tool about its axis. Manufacture of the tool may therefore be considerably simpler than in the case of manufacturing tools such as the Tri-vex tool mentioned above, where machining of convex surfaces can require complicated tool off-sets to achieve the correct shape. The depth of material machined away from the probe to form a flat portion may vary along the length of the probe. For example, there may be a flat portion in relation to which more material by depth is machined away at the root of the probe than at the tip. Additionally, or alternatively, there may be a flat part in relation to which less material, by depth, is machined away at the root than at the tip of the probe. Thus, the depth of material machined away at a given length along the probe may be different as between two different flat portions.

There is further provided a method of welding together two metal work-pieces using a friction stir welding tool according to any aspect of the invention defined herein. The method of welding preferably includes the steps of:

providing two metal work-pieces having a thickness of greater than 10 mm, providing a friction stir welding tool according to any aspect of the invention defined herein, and using the tool to weld together the two work-pieces.

The welding method may be of particular advantage in the case where the work-pieces are made from aluminium alloys and/or where the work-pieces are suitable for use in the manufacture of an aircraft component. For example, the metal may be any conventional or suitable alloy used in the aerospace industry, such as 2000 series, 6000 series, 7000 series aluminium alloys, or aluminium-lithium alloys. The two work-pieces may, but need not be, of the same type of material.

There is yet further provided a method of manufacturing a component, and more preferably an aircraft component, using a friction stir welding tool according to any aspect of the invention defined herein. The method of manufacture preferably includes the steps of: providing a block of metal from which a component, and more preferably an aircraft component, is machined, wherein the block of metal has been made from two or more work-pieces welded together in accordance with a method of welding according to any aspect of the invention defined herein. The block of metal may conveniently, but not necessarily, be generally cuboid in shape. The component may for example be in the form of a part of the primary structure of an aircraft. The component may for example form at least part of a spar for an aircraft wing box. It will be appreciated that a component formed by means of the present invention may require further processing before assembly. The component may therefore, in certain circumstances, be considered as an intermediate, requiring further processing before being considered as a finished article. For example, the component may require further machining, treating, assembly with other parts, or any other such processes. It will therefore be understood that the term component is used herein both to cover the case where the component is in a state ready for final assembly and the case where the component is at an earlier stage in the component's manufacture.

BRIEF DESCRIPTION OF THE DRAWINGS

Embodiments of the present invention will now be described by way of example only with reference to the accompanying drawings, of which:

FIGS. 2a to 2c illustrate schematically the shape of a FSW tool according to a first embodiment of the invention; and FIG. 3 illustrates schematically a partial profile of a FSW tool according to a second embodiment of the invention.

DETAILED DESCRIPTION

Figure 1A:
FIGS. 1a to 1c illustrate schematically the profiles of three FSW welding tools of the prior art.
Figure 1B:
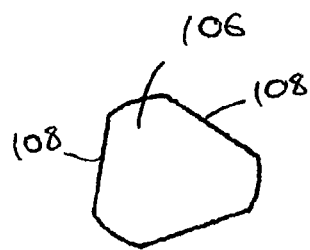
Figure 1C:
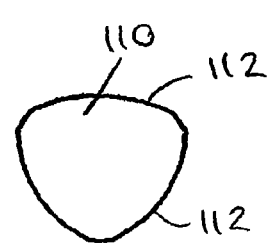

By way of background to the FSW tool of the first embodiment of the present invention it is perhaps useful to describe briefly tool shapes of the prior art. Three such prior art tool profiles are shown schematically in FIGS. 1a to 1c, which illustrate the general cross-sectional shape of the probes of a "Tri-flute" tool, a "Tri-flat" tool and a "Tri-vex" tool, respectively. In each case three sections are machined away from the generally cylindrical profile (defined by the notional circle—not shown—that smoothly envelopes the shapes as shown in FIGS. 1a to 1c. In FIG. 1a, the "Tri-flute" shaped tool 102 is defined by three separate equiangularly spaced concave regions 104, in FIG. 1b, the "Tri-flat" shaped tool 106 is defined by three separate equiangularly spaced flats 108, and in FIG. 1c, the "Tri-vex" shaped tool 110 is defined by three separate equiangularly spaced convex regions 112.

FIGS. 2a and 2b show a triple tri-flat FSW tool 2, in cross-section and in plan (when viewed from the end of the tool) view, respectively, in accordance with a first embodiment of the invention. The tool 2 comprises a shoulder portion 4 from which there extends a probe 6, in the form of a tapering pin. The probe 6 of the tool 2 is made by machining away flats 8 from a conically shaped threaded pin. The thread on the pin is in the form of a single 2000 coarse metric 60 degree thread having a 2 mm pitch, there being just under ten turns of thread on the probe. The probe 6 has a length l of 20 mm. The probe 6 tapers from the shoulder 4 to its tip at an angle of about 12 degrees, the diameter at the tip being about 9 mm. The flats 8 are grouped in three sections 8a, 8b, 8c, each section consisting of three contiguous flats 8. The flats 8 in each section are machined to form a generally convex profile, when viewed in cross-section (the normal of the cross-section being parallel to the axis 12 of the probe). A schematic diagram showing such a cross-section of the probe of the first embodiment is shown in FIG. 2c. In FIG. 2c there are shown three flats 8 in one section 8a of the probe, the axis 12 of which is illustrated in FIG. 2c by means of a cross. (It will be appreciated that the angular separation of the flats 8 and their normal axes 14 are exaggerated for the sake of clarity in FIG. 2c.) As can be seen in FIG. 2c, the normal axes 14 of the flats 8 converge in a direction towards the axis 12 of the probe 6 and define a generally convex profile (the convex profile being shown by a notional convex surface 16 in FIG. 2c). With reference to FIGS. 2a and 2b, the sections are each centred so that the sections are equiangularly spaced about the axis 12 of the probe 6 (i.e. 120 degrees apart). The three sections 8a to 8c, consisting of three flats 8 each, are separated by threaded portions 10a, 10b, 10c, there being a threaded region 10 between each pair of adjacent sections.

The tool 2 illustrated by FIGS. 2a and 2b was used to produce welds in 20 mm thick aluminium alloy 7150 plate (suitable for aircraft primary structure use) and the loads sustained by the tool measured. Tri-flat, Tri-flute and Tri-vex shaped tools of similar dimensions were also tested on the same 20 mm thick 7150 plate. The Tri-vex tool did not produce a weld of sufficiently good quality for aircraft primary structure. It was also found that the loads sustained by the tool 2 of the present embodiment during welding were less than the loads sustained by the equivalently sized Tri-flat and Tri-flute shaped tools as is shown by the data reproduced in the tables below.

Load Reduction (Given as a Percentage) when Compared to a Tri-flat Tool at 75 mm/min and 150 mm/min

TABLE 1

| Feed rate | Traversing load reduction | Torque reduction | Vertical load reduction |
|---|---|---|---|
| 75 mm/min | 20% | 5.5% | Equal |
| 150 mm/min | 20% | 20% | Equal |

Load Reduction (Given as a Percentage) when Compared to a Tri-flute Tool at 75 mm/min Feed Rate (FSW at 150 mm/min could not be Produced as Vertical Load Required Exceeded Machine Capability)

TABLE 2

| Traversing load reduction | Torque reduction | Vertical load reduction |
|---|---|---|
| 54% | 10.5% | 25% |

It should be noted that for both of the above tables, the percentages quoted may be slightly distorted as the tool area to swept area ratios were not exactly identical as between the different probe designs (see ref. Science and Technology of Welding and joining 2004 Vol. 9 No. 4, Development of Trivex friction stir weld tool Part 1).

An FSW tool according to a second embodiment of the invention is illustrated schematically by FIG. 3, which shows a partial cross-section of a probe 20 of the FSW tool, the probe 20 having three sections, separated by threaded regions 22, each section consisting of seven flats 24. The seven flats 24 present a smoother profile between the threaded regions 22 of the probe 20.

Whilst the present invention has been described and illustrated with reference to particular embodiments, it will be appreciated by those of ordinary skill in the art that the invention lends itself to many different variations not specifically illustrated herein. By way of example only, certain variations to the above-described embodiments will now be described.

A FSW tool according to an embodiment of the invention could be used to weld thicker workpieces than described above with reference to the Figures. It is envisaged that tools having probe lengths of at least 30 mm could be successfully used to perform welds in materials up to a depth of a similar size. Rather than being conical (as shown in the Figures), the probe of the tool could be cylindrical in shape. The amount of thread between the sections of flats and the type of thread (form, pitch and depth) may be adjusted to improve the achievable weld quality in relation to a particular application by means of routine experimentation. The invention may have application in relation to alloys other than Aluminium alloys. Other modifications will, of course, be apparent to the person skilled in the art.

Where, in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not delimit the scope of the independent claims.

The invention claimed is:

1. A friction stir welding tool, wherein
the tool comprises
a shoulder, and
a probe extending from the shoulder,
the probe has at least three sections equiangularly arranged around the longitudinal axis of the probe, each section comprising a plurality of contiguously arranged substantially flat portions positioned in series along a common circumference about the longitudinal axis of the probe, the flat portions being so arranged that the normal axes of the flat portions converge in a direction towards the axis of the probe, and the probe includes a threaded portion disposed between each pair of adjacent sections.

2. A tool according to claim 1, wherein none of the sections are threaded.

3. A tool according to claim 1, wherein the probe tapers along its length.

4. A tool according to claim 1, wherein the probe has a substantially constant diameter along at least the majority of its length.

5. A tool according to claim 1, wherein each section comprises at least four substantially flat portions arranged about the axis of the probe.

6. A method of manufacturing a friction stir welding tool wherein the method comprises the following steps:

providing a tool having a shoulder and a threaded probe extending from the shoulder, and machining away material from the threaded probe to form at least three sections equiangularly arranged around the longitudinal axis of the probe, each section comprising a plurality of contiguously arranged substantially flat portions positioned in series along a common circumference about the longitudinal axis of the probe, the flat portions being so arranged that the normal axes of the flat portions converge in a direction towards the axis of the probe, the probe thereby including a threaded portion disposed between each pair of adjacent sections 7. A method of welding together two metal work-pieces, wherein the method includes the following steps:

(a) providing two metal work-pieces having a thickness of greater than 10 mm, (b) providing a friction stir welding tool, the tool comprising a shoulder, and a probe extending from the shoulder wherein the probe has at least three sections equiangularly arranged round the longitudinal axis of the probe, each section comprising a plurality of contiguously arranged substantially flat portions positioned in series along a common circumference about the longitudinal axis of the probe, the flat portions being so arranged that the normal axes of the flat portions converge in a direction towards the axis of the probe, and the probe includes a threaded portion disposed between each pair of adjacent sections, and (c) using the tool to weld together the two work-pieces.

8. A method according to claim 7, wherein the work-pieces are made from aluminium alloys.

9. A method according to claim 7, wherein the work-pieces are suitable for use in the manufacture of an aircraft component.

10. A tool according to claim 1, wherein each section comprises at least three substantially flat portions arranged about the axis of the probe.

* * * * *